(12) United States Patent
Hartness, III et al.

(10) Patent No.: US 6,182,812 B1
(45) Date of Patent: Feb. 6, 2001

(54) DEVICE FOR TRANSFERRING ARTICLES BETWEEN OPPOSITELY RUNNING CONVEYORS

(75) Inventors: William R. Hartness, III; Thomas P. Hartness; David N. Cooley, all of Greenville, SC (US)

(73) Assignee: Hartness International, Greenville, SC (US)

( * ) Notice: Under 35 U.S.C. 154(b), the term of this patent shall be extended for 0 days.

(21) Appl. No.: 09/365,119

(22) Filed: Jul. 30, 1999

(51) Int. Cl.[7] .................................................. B65G 37/00
(52) U.S. Cl. .............................. 198/364; 198/597
(58) Field of Search .................... 198/364, 452, 198/597, 598, 457.05

(56) References Cited

U.S. PATENT DOCUMENTS

| | | |
|---|---|---|
| 3,318,439 | 5/1967 | Sullivan . |
| 4,018,325 | 4/1977 | Rejsa . |
| 4,063,632 | 12/1977 | Neth et al. . |
| 4,201,286 | 5/1980 | Meier . |
| 4,364,465 | * 12/1982 | Kraft et al. ........................... 198/452 |
| 4,401,020 | * 8/1983 | Brux .................. 198/598 X |
| 4,413,724 | 11/1983 | Fellner . |
| 4,469,219 | 9/1984 | Cossé . |
| 4,513,858 | 4/1985 | Fellner . |
| 4,549,647 | 10/1985 | Cossé . |
| 4,718,656 | 1/1988 | Reist . |
| 4,889,223 | 12/1989 | Bergstrom . |
| 4,944,315 | 7/1990 | Focke . |
| 4,989,718 | 2/1991 | Steeber . |
| 5,067,857 | 11/1991 | Ward . |
| 5,350,050 | 9/1994 | Franke . |
| 5,413,213 | 5/1995 | Golz et al. . |
| 5,417,317 | 5/1995 | Kalinich . |
| 5,490,589 | 2/1996 | Golz et al. . |
| 5,636,723 | 6/1997 | Bulle et al. . |
| 5,690,463 | 11/1997 | Yoshie . |
| 5,772,005 | 6/1998 | Hänsch . |
| 5,903,464 | 5/1999 | Stingel, Jr. et al. . |
| 6,026,947 | 2/2000 | Persson . |

FOREIGN PATENT DOCUMENTS

| | | |
|---|---|---|
| 1262886 | 3/1968 | (DE) . |
| 2307728 | 9/1974 | (DE) . |
| 2618905 | 11/1977 | (DE) . |
| 0259650A3 | 3/1988 | (EP) . |
| 0635414A1 | 1/1995 | (EP) . |
| 0831911 | 9/1957 | (GB) . |

OTHER PUBLICATIONS

Co–pending U.S. application No. 09/036,745, filed Mar. 9, 1998, entitled "An Apparatus for Controlling the Flow of Articles".
Co–pending U.S. application No. 09/235,888, filed Jan. 22, 1999, entitled "An Apparatus for Controlling the Flow of Articles".
International Search Report for International Application No. PCT/US00/12958, filed May 12, 2000, entitled "Device for Transferring Articles Between Oppositely Running Conveyors".

* cited by examiner

Primary Examiner—James R. Bidwell
(74) Attorney, Agent, or Firm—Dority & Manning, P.A.

(57) ABSTRACT

An apparatus is provided for controlling the flow of articles. The apparatus includes a first conveyor driven in a first direction and a second conveyor driven in a second opposite direction. The conveyors extend in a side-by-side and parallel relationship with a space defined therebetween. A movable transport member is disposed within the space between the conveyors and defines a bridge that extends across the space and is generally flush with the upper surfaces of the conveyors. The transport member is drivingly engaged by the conveyors so as to move linearly between the conveyors depending on a speed differential of the conveyors. An article transfer member is carried by the transport member and is disposed transversely to the conveyors to contact and transfer the articles from the first conveyor over the bridge member and onto the second conveyor.

16 Claims, 7 Drawing Sheets

DEVICE FOR TRANSFERRING ARTICLES BETWEEN OPPOSITELY RUNNING CONVEYORS

BACKGROUND OF THE INVENTION

The present invention relates to a device for controlling the transfer of articles between oppositely running conveyors.

There are many applications wherein oppositely running conveyors disposed side by side and generally parallel are used for transporting articles. A common such use is in conveying accumulator systems utilized between an upstream delivery station and a downstream receiving station to accumulate or store articles when the capacity of the downstream receiving station is either shut down or run at a speed wherein it cannot handle the number of articles being fed by the upstream delivery station. Such accumulator conveying systems are well known to those skilled in the art. One particular accumulator is disclosed in U.S. Pat. No. 4,018,325. An additional prior art accumulator system is disclosed in U.S. Pat. No. 4,513,858. With such accumulator systems, and any other system wherein articles are transferred from one conveyor running in one direction onto another conveyor running in an opposite direction, a device must be provided for controlling the transfer of the articles from one conveyor onto the other.

The present invention relates particularly to an improved transport device utilized for controlling the transfer of articles from a first conveyor running in a first direction onto a second conveyor running in a second opposite direction.

OBJECTS AND SUMMARY OF THE INVENTION

It is therefore a principal object of the present invention to provide an improved apparatus for controlling the flow of articles, particularly the flow of articles from a first conveyor driven in a first direction onto a second conveyor driven in a second direction.

An additional object of the present invention is provide a system that includes a first conveyor driven in a first direction and a second conveyor driven in a second direction, as well as an improved transport member utilized to transfer articles from the first conveyor onto the second conveyor.

Still another important object of the present invention is to provide an article storage accumulator which permits a large number of articles to be stored in a relatively small amount of floor space.

Yet still another object of the present invention is to provide an improved article transport member for use on conventional conveyors that is far less complicated that conventional devices.

Additional objects and advantages of the invention will be set forth in the following description, or may be obvious from the description, or may be learned through practice of the invention.

The present invention has particular application in conveyor accumulator systems wherein oppositely running and parallel conveyors are used to accumulate and store articles between an upstream receiving station and a downstream delivery station. One such accumulator system is disclosed and described in co-pending U.S. Pat. Appl. Ser. No. 09/235,888 entitled "Apparatus for Controlling the Flow of Articles." The '888 application is incorporated herein in its entirety for all purposes.

Although conveyors are a feature of the present invention, conventional conveyors are well known to those skilled in the art and need not be described herein in great detail. The features of the conveyors necessary for an understanding of the invention will be sufficiently described.

In accordance with the objects and purposes of the invention, an apparatus is provided for controlling the flow of articles. This apparatus includes a first conveyor driven in a first direction to convey articles thereon in the first direction. A second conveyor is driven in a second opposite direction to convey articles thereon in the opposite direction. As mentioned above, the first and second conveyors may be used in a conventional accumulator system. The conveyors extend generally side by side and parallel with a constant space defined between the inside edges thereof.

A movable transport member is disposed within the space defined between the conveyors and comprises a bridge that extends across the space between the conveyors and is generally flush with the upper surfaces of the conveyors. The transport member is drivingly engaged by both of the conveyors so as to move linearly between the conveyors depending on a speed differential of the conveyors. In other words, the transport member and bridge move in the direction of the faster conveyor. If both conveyors are moving linearly in opposite directions but at the same speed, the transport member remains stationary relative to the conveyors. An article transfer member is carried by the transport member and is operably disposed relative to one of the conveyors, for example the first conveyor, to contact and transfer articles from the first conveyor to the second conveyor. The transport member may comprise a relatively simple deflecting bar or rail.

The transport member may comprise a drive wheel that is simultaneously engaged by drive lugs on each of the conveyors. The drive wheel has gear teeth engaged by the drive lugs so as to continuously rotate so long as at least one of the conveyors is moving.

In a preferred embodiment, the bridge member comprises a deformable rail having dimensions so as to fit between the conveyors within the space defined between the conveyor edges. The rail has a longitudinal length to define a length of the bridge member. In a preferred embodiment, the bridge member is comprised of a plurality of pivotally connected links having an upper surface that is generally flush with the upper surface of the conveyors. The links are pivotally connected and thus deformable so that the transport member and bridge can easily follow curves or turns in the conveyors.

In a preferred embodiment, the transport member also includes a deflecting rail carried by the transport member longitudinally distanced from the bridge. This deflecting rail is oriented so as to deflect articles that are transferred from the first conveyor over the bridge to a middle portion of the second conveyor. This deflecting rail may be spring loaded toward the second conveyor.

The transport member may comprise any manner of frame or structure. In a preferred embodiment, the transport member comprises a relatively simple carriage that is connected at one end to a drive wheel and at an opposite end to a support wheel. The drive wheel may be configured as discussed above with gear teeth that engage with drive lugs on the under side of the conveyors. The article transfer member is carried by this carriage member. The support wheel is longitudinally distanced from the drive wheel and rigidly connected to the drive wheel by means of the carriage to ensure that the carriage and article transfer member remain aligned at all times relative to the conveyors, particularly through turns or bends in the conveyors.

The invention will be described below in greater detail through use of the attached figures.

DETAILED DESCRIPTION

Figure 1:
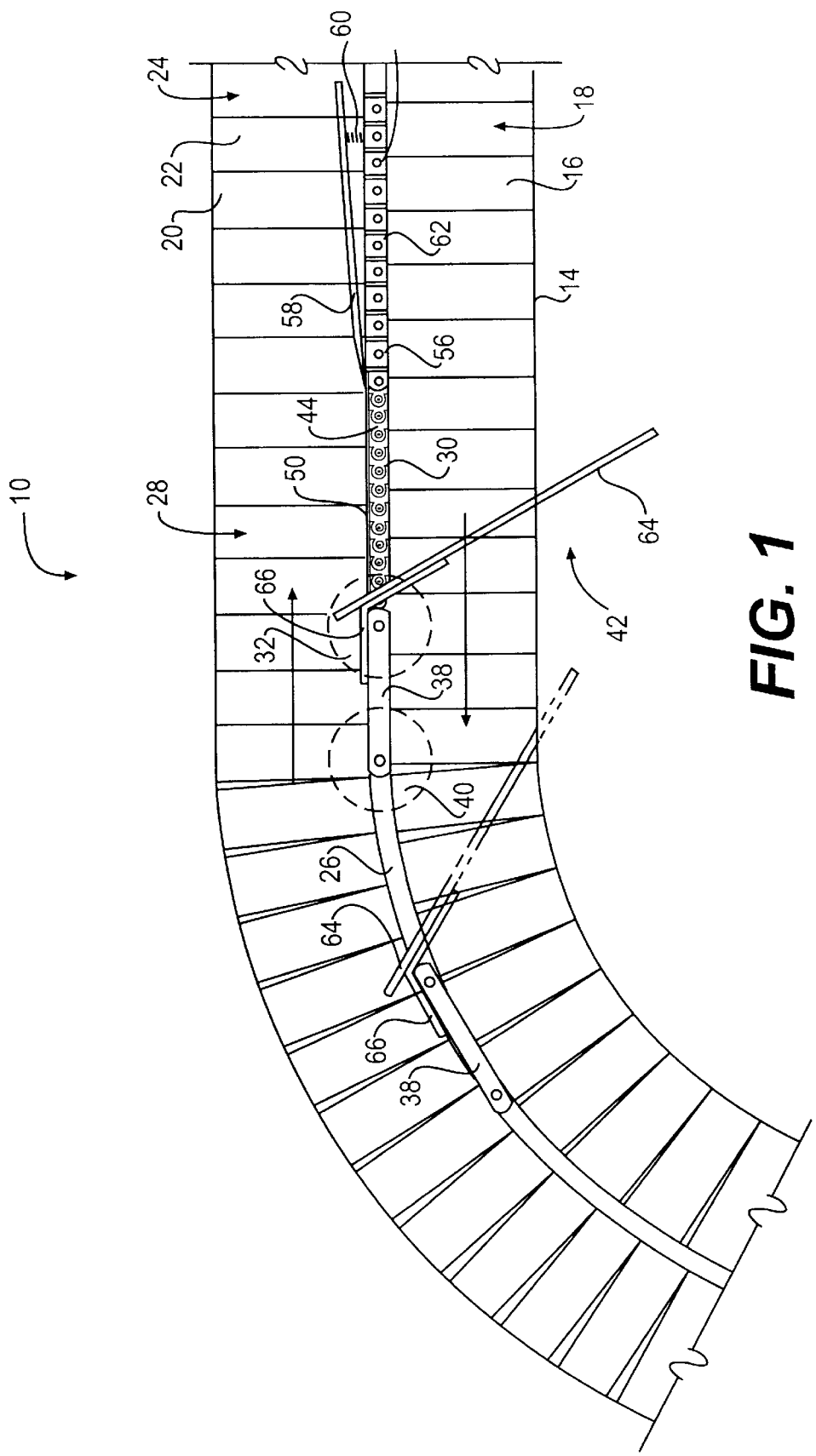
FIG. 1 is a perspective view of an apparatus for controlling the flow of articles according to the invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment may be utilized on another embodiment to yield still a further embodiment. It is intended that the present invention include such modifications and variations.

Figure 2:
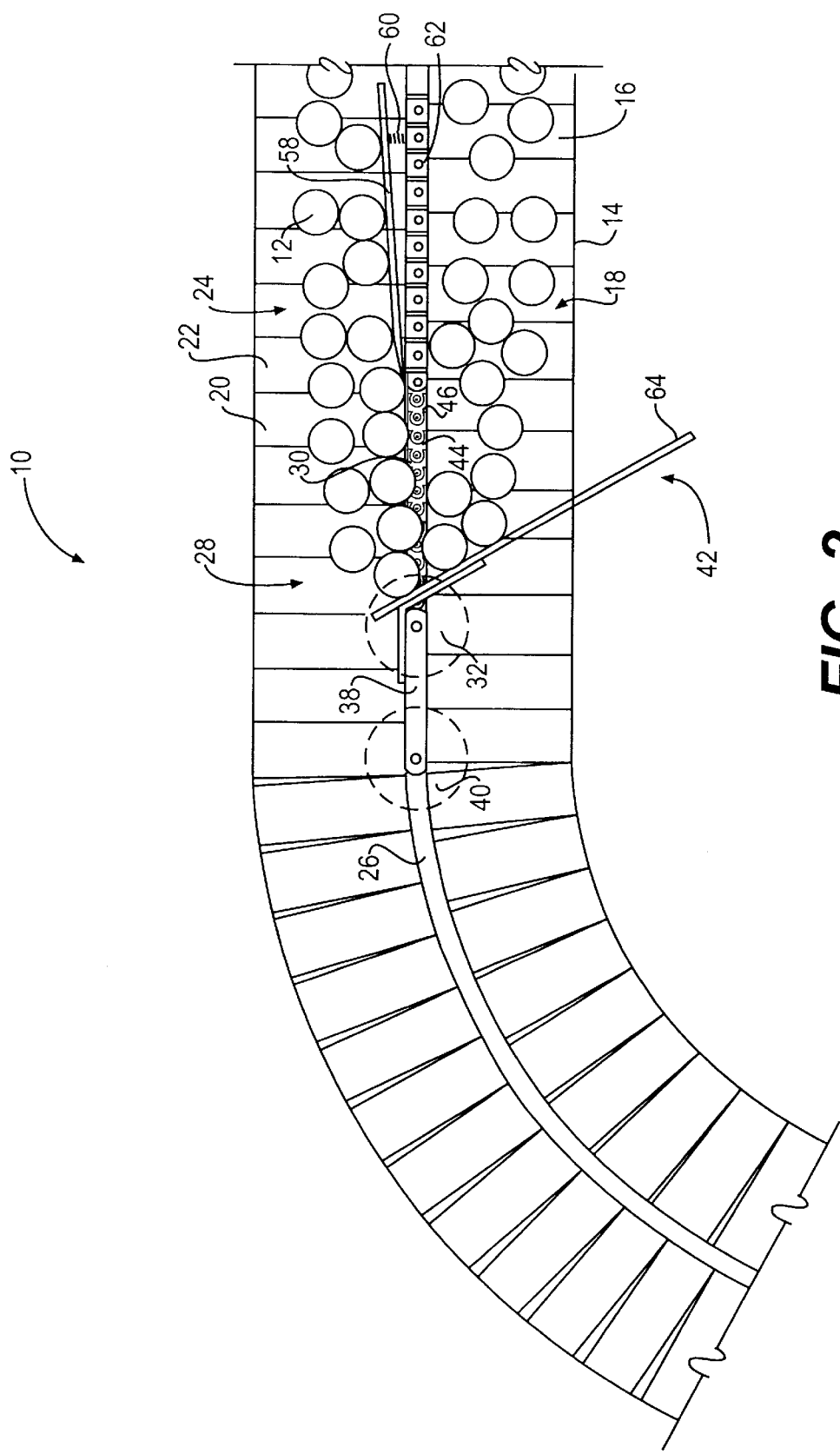
FIG. 2 is a perspective view of the apparatus of FIG. 1 particularly illustrating articles being transferred from a first conveyor onto a second conveyor.
Figure 3:
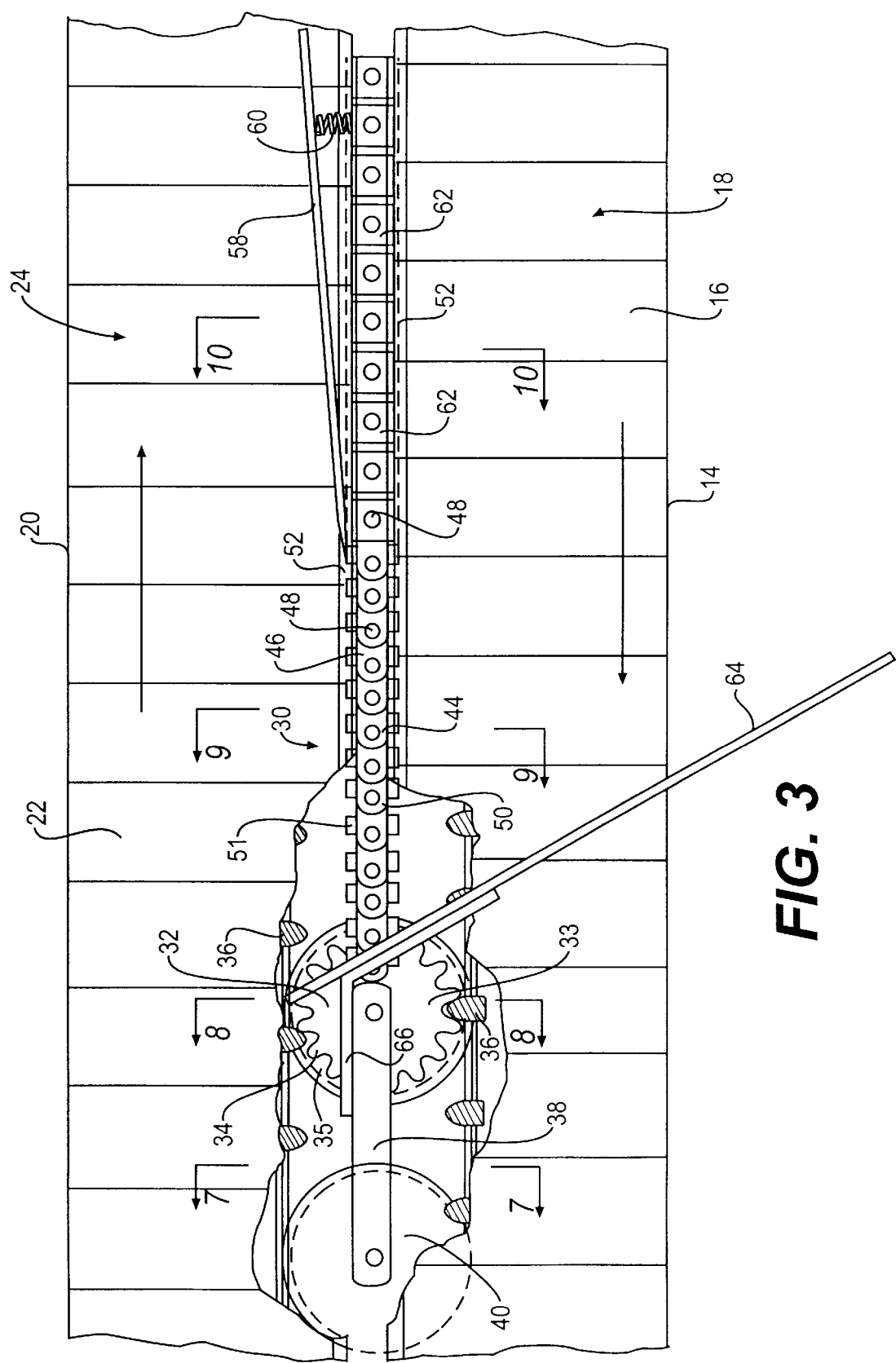
FIG. 3 is a partial cut away view of the apparatus illustrated in FIG. 1.

An apparatus, generally 10, for controlling the flow of articles according to the invention is illustrated generally in FIGS. 1–3. Apparatus 10 includes a first conveyor 14 that moves in a first direction, and second conveyor 20 that moves in a second opposite direction. The first and second conveyors 14,20 are arranged in a side-by-side and parallel relationship such that a constant space 26 is defined between the inside edges of the conveyors. Conveyors 14,20 may be formed as any conventional conveyor, including conventional link-type conveyors, belt conveyors, and the like.

The present invention is not limited to any particular conveying system and has application in any system wherein articles are to be moved from a first conveyor onto a second conveyor. As mentioned above, a conventional system incorporating such oppositely moving and parallel conveyors is an accumulator system used for accumulating and storing articles between an upstream receiving station and a downstream delivery station. A detailed description of an accumulator system is provided in co-pending U.S. Pat. Application Serial No. 09/235,888 entitled "Apparatus for Controlling the Flow of Articles". The '888 application is incorporated herein in its entirety for all purposes.

Figure 4:
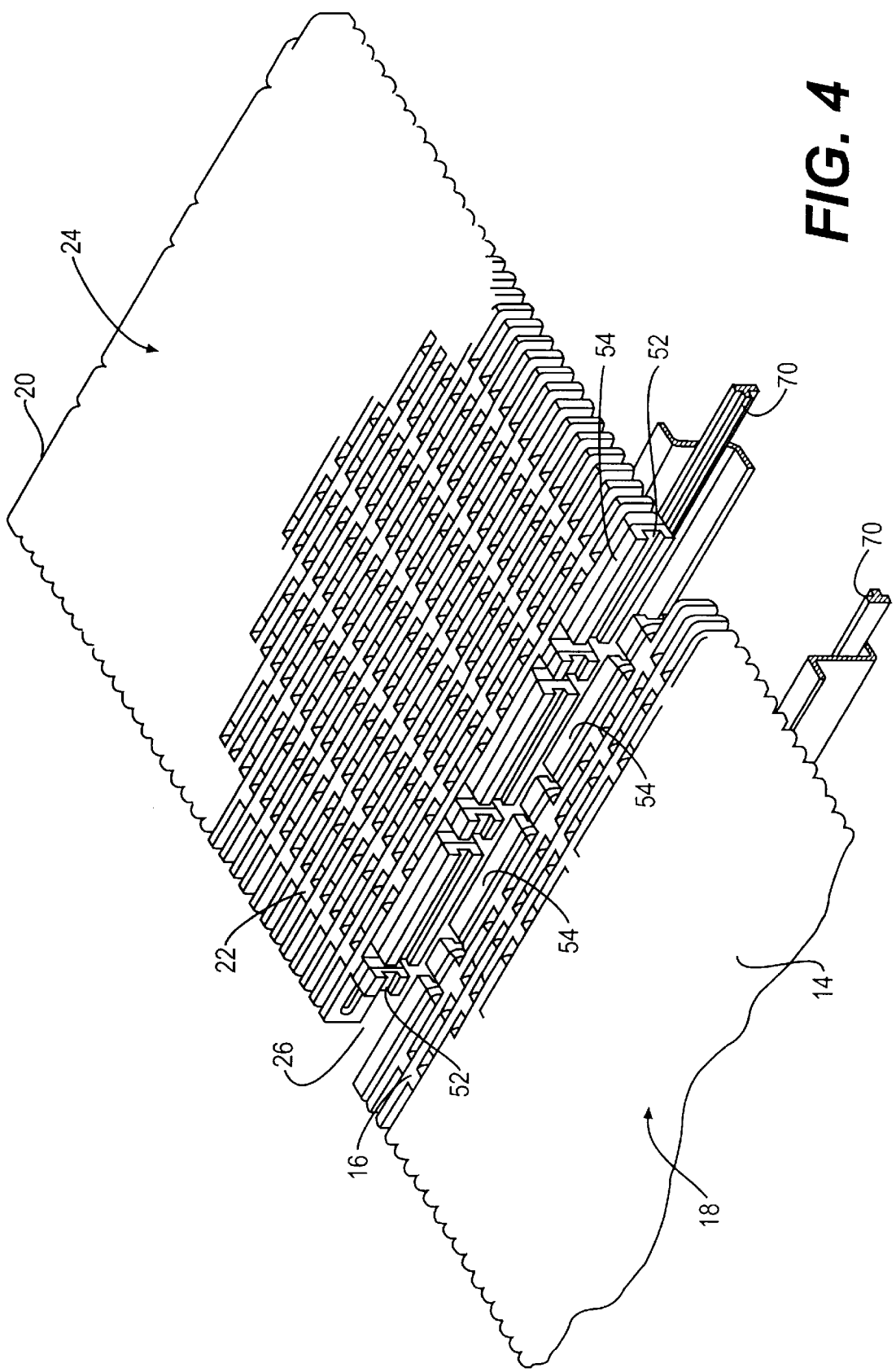
FIG. 4 is an enlarged perspective view of the conveyors utilized in the present invention.
Figure 5:
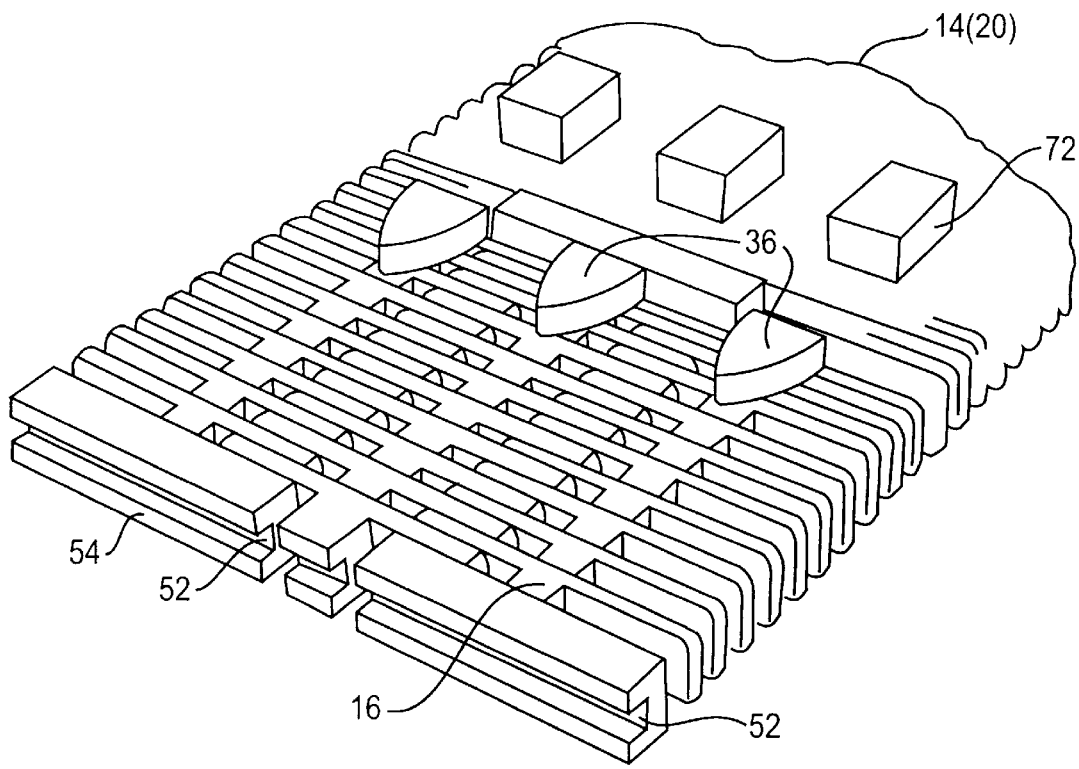
FIG. 5 is a perspective underside view of the conveyors.

Conveyors 14,20 may be formed of individual interconnected segments or links 16,22, as is well understood by those skilled in the art. Conveyors 14,20 define upper conveying surfaces 18,24 upon which articles are placed to be conveyed by the conveyors. A detailed view of segments of conventional conveyors comprised of individual interconnected links or segments 16,22 is provided in FIGS. 4 and 5. Referring particularly to FIG. 5, the underside of the conveyors 14,20 are provided with a number of equally spaced drive dogs 72. These drive dogs 72 are conventionally engaged by a drive motor or other mechanism for moving the conveyor in the conveying direction. Equally spaced apart conveyor lugs 36 are also provided on the underside of conveyors 14,20. These drive lugs 36 are engaged by a drive wheel 32 of the article transport member, as shown in FIG. 3 and discussed in greater detail below.

The inside or facing edges of conveyors 14,20 defining space 26 therebetween have a guide channel 52 defined therealong. Channel 52 may have a generally U-shaped channel. Channel 52 may be defined by segments 54 that are attached onto the inside edges of conveyors 14,20. Alternatively, channels 52 may be formed integral with the conveyor segments 16,22 in the molding process. Channels 52 are engaged by links 46,62 of the movable transport member, as discussed in greater detail below.

A movable transport member, generally 28, is provided to transport articles 12 from the first conveyor 14 onto second conveyor 22, as generally illustrated in FIG. 2. Movable transport member 28 is disposed within the space defined between conveyors 14,22 and comprises a bridge 30 that extends between the conveyors and is generally flush with upper surfaces 18,24 of conveyors 14,20.

In a preferred embodiment of the transport member illustrated in the figures, the bridge 30 comprises a deformable rail member, generally 44. Rail member 44 has dimensions so as to fit between conveyors 14,20 within space 26 over a longitudinal length thereof. In a preferred embodiment, rail 44 is comprised of a plurality of pivotally connected links 46, as particularly illustrated in FIG. 6. Links 46 have a height such that their upper surface 50 is flush with the upper surfaces 18,24 of conveyors 14,20. Links 46 may be molded in a conventional process from any suitable plastic or other material. Links 46 are pivotally connected to each other by way of pivot pins 48. Thus, the rigid links 46 when connected form a deformable rail 44 defining bridge 30.

Links 46 include outwardly extending guide tabs 51. Guide tabs 51 slide within and along guide channels 52 defined on the inside edges of conveyors 14,20.

Transport member 28 may be drivingly engaged by conveyors 14,20 so as to move linearly between the conveyors depending on a speed differential of the conveyors thereby causing the transport member to move in the direction of the faster of the conveyors. In this manner, transport member 28 includes, for example, a drive wheel 32. Drive wheel 32 includes gear teeth 34 that are engaged by drive lugs 36 on the underside of each of conveyors 14,20, as particularly illustrated in FIG. 3. Accordingly, as can be understood from FIG. 3, if conveyors 14 and 20 move in opposite directions but at equal speeds, drive wheel 32 will continuously rotate but will remain in the same relative linear position. Guide wheel 32 will advance in the direction of the faster of the conveyors. It should be appreciated that other drive mechanisms may also be used for moving transport member 28, including separate chain drives, differential gear arrangement, servos, etc.

Figure 7:
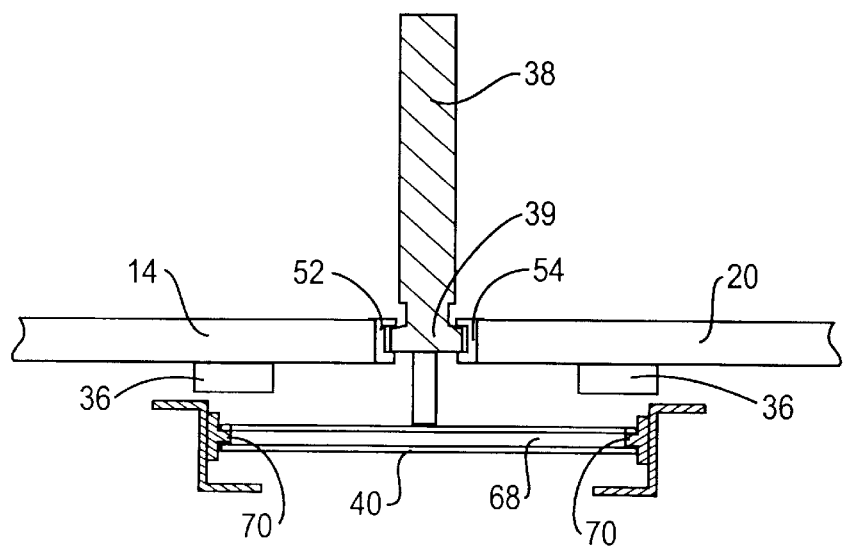
FIG. 7 is a cross-sectional view taken along the lines indicated in FIG. 3.
Figure 8:
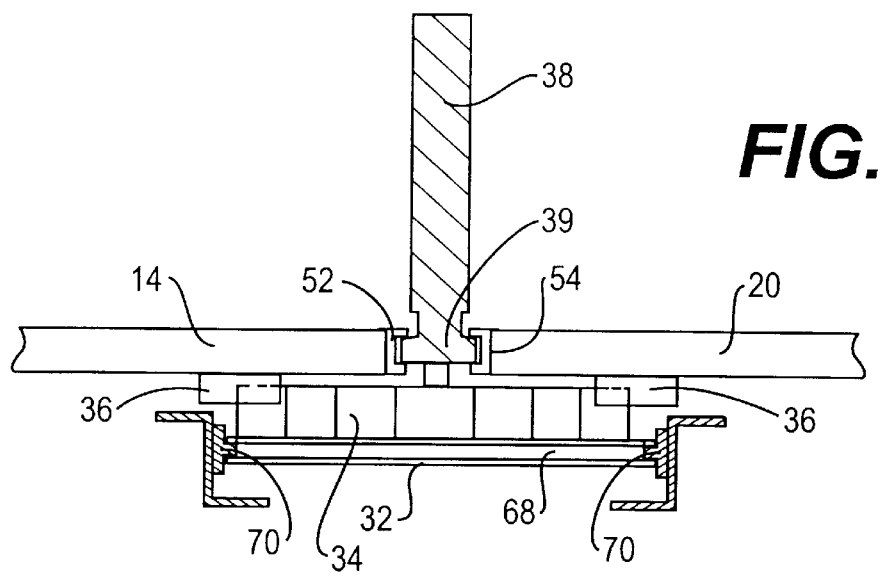
FIG. 8 is a cross-sectional view taken along he lines indicated in FIG. 3.
Figure 9:
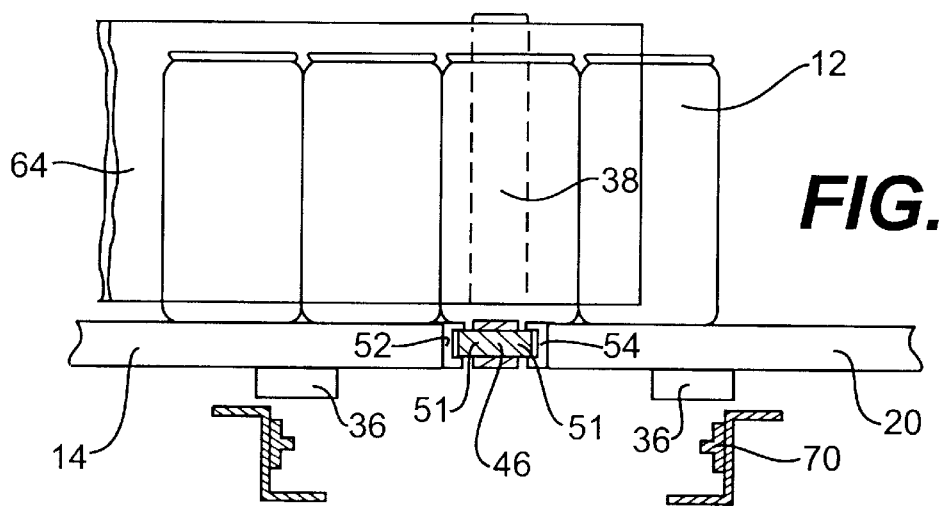
FIG. 9 is a cross-sectional view taken along the lines indicated in FIG. 3.
Figure 10:
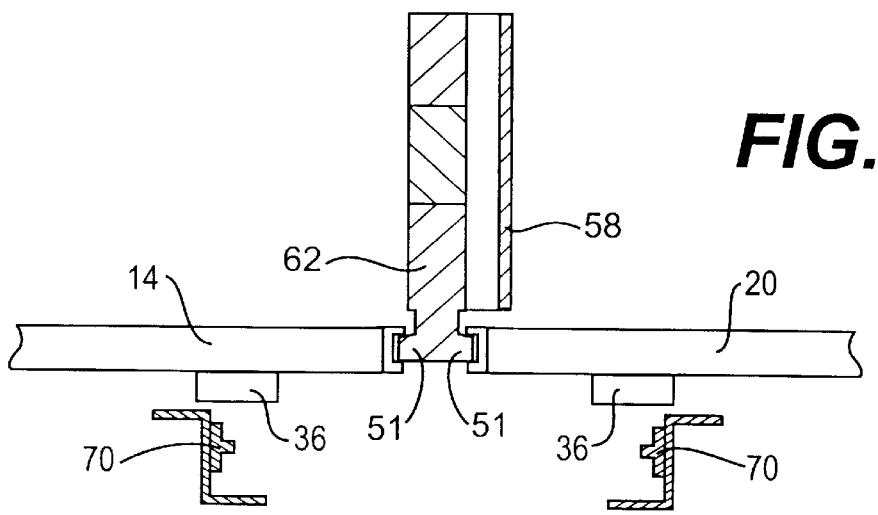
FIG. 10 is a cross-sectional view taken along the lines indicated in FIG. 3.

Deformable rail 44 or bridge 30 is connected to drive wheel 32 such that drive wheel 32 either pushes or pulls deformable rail 44 between conveyors 14,20. Drive wheel 32 is formed by an upper section 33 and a lower section 35, as particularly seen in FIGS. 3 and 6. Upper section 33 has drive teeth 34 defined around the circumference thereof. Lower section 35 has a wheel groove or channel 68 defined around the circumference thereof. Channel 68 rides along wheel guides 70 disposed on structure below conveyors 14,24, as particularly illustrated in FIG. 4 and in the cross-sectional views of FIGS. 7 and 8.

Article transport member 28 may also include a support wheel 40 longitudinally distanced from drive wheel 32. Support wheel 40 is rigidly connected with drive wheel 32 by, for example, a carriage member for device 38. Support wheel 40 also includes wheel groove 68 formed on the circumference thereof that engages with wheel guides 70, as with drive wheel 32. Support wheel 40 and carriage 38 ensure that the drive wheel and deformable rail 44 are always aligned relative to the conveyors, particularly as transport member 28 moves through curves or bends of the conveyor system.

In the embodiment illustrated, carriage 38 is configured by a relatively simple upright or rigid member. Carriage 38 also includes tabs or guides 39 formed thereon that also engage within conveyor guide channels 52 defined on the inside edges of conveyors 14,20. Deformable rail 44, and particularly links 46, are attached by any conventional manner onto carriage 38.

An article transfer member, generally 42, is carried by transport member 28. In a preferred embodiment, transfer member 42 may include a relatively rigid deflecting bar 64 that is oriented transversely to the first conveyor. Articles conveyed on first conveyor 14 impinge upon bar 64 and are directed to slide across bridge 30 between conveyors 14,20 formed by deformable rail 44 as particularly illustrated in FIG. 2. Thus, the articles simply slide over bridge 30 and onto second conveyor 20 moving in the opposite direction of conveyor 14. Article transfer member 42 can take on any manner of shape or configuration, for example a curved plate, rail, or the like.

In the embodiment illustrated in the figures, article transfer member in the form of deflecting bar 64 is carried by transport member 28 by means of a brace 66. In the embodiment wherein deflecting bar 64 is rigidly disposed relative to transport member 28, it may desired that deflecting bar 64 have a length to ensure that it will extend completely across conveyor 14 even as transport member 28 is driven around curves or bends in the conveyors. For example, it may be preferred that deflecting bar 64 extends over the edge of first conveyor 14, as generally illustrated in FIGS. 1 and 2. It should be appreciated that other devices may also be utilized to account for movement of the transfer member 42 around bends or curves.

Figure 6:
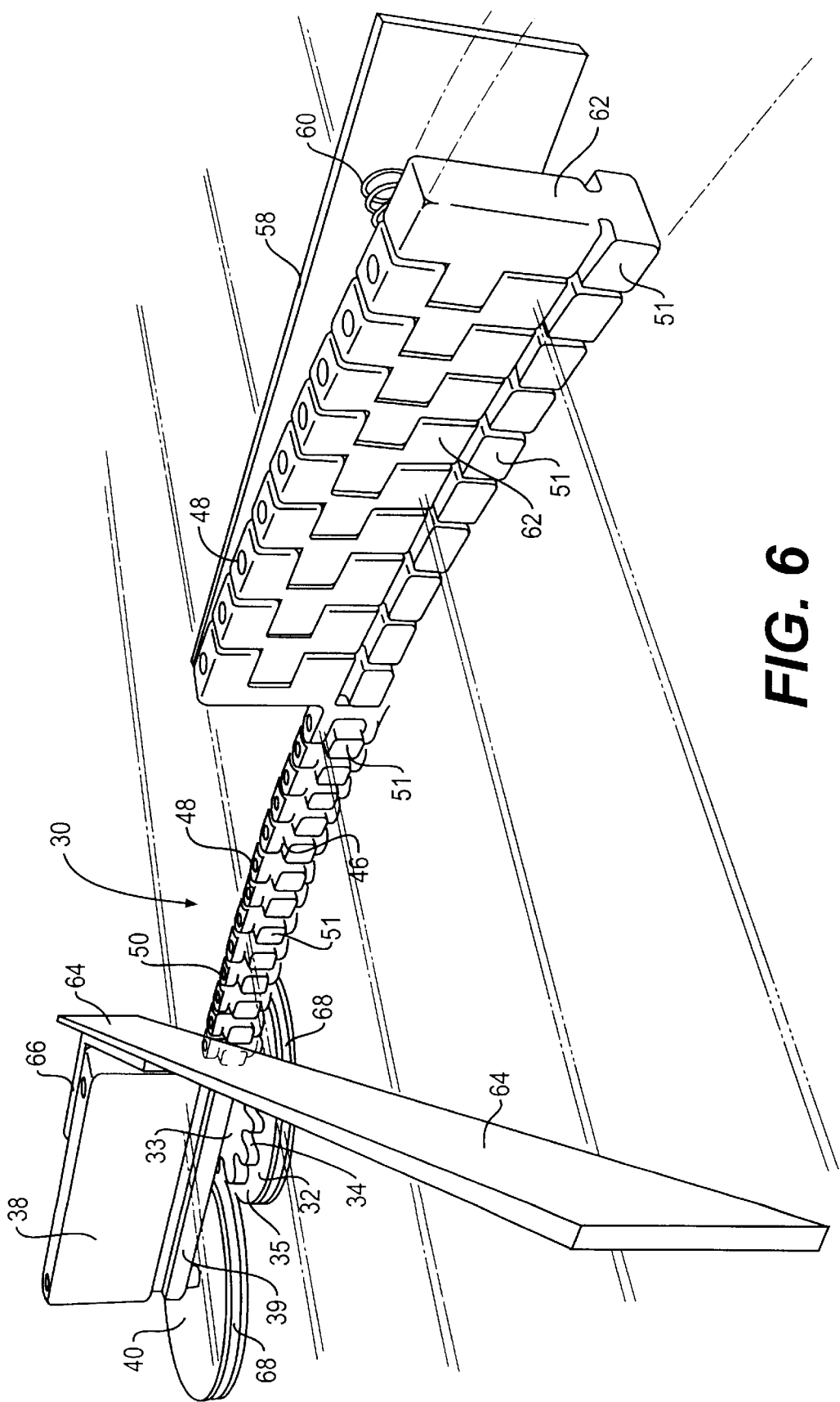
FIG. 6 is a side perspective view of the movable transport member according to the invention.

It may also be preferred that transport member 28 include a deflecting rail, generally 58 that is longitudinally distanced from bridge 30. Referring particularly to FIG. 6, deflecting rail 58 is carried by a plurality of interconnected fence links 62. Links 62 have a height so as to extend well above the upper surfaces of conveyors 14,20 and thus form a fence or barrier that defines the limit of bridge 30. In other words, bridge 30 is defined between deflecting bar 64 and the beginning of fence links 62.

Deflecting rail 58 is attached to the first of links 62 in the embodiment illustrated and may also be spring loaded towards second conveyor 20 by means of spring 60. Rail 58 ensures that articles transferred onto second conveyor 20 are moved towards a middle portion or section of the second conveyor.

FIGS. 7–10 are cross-sectional views of the apparatus 10 according to the invention taken along the lines indicated in FIG. 3. FIGS. 7–10 give a detailed cross-sectional view of the invention.

It should be appreciated by those skilled in the arts that various modifications and variations can be made in the present invention without departing from the scope or spirit of the invention. For example, bridge 30 or deformable rail 44 need not be formed by individual interconnected links, but may be formed by an integral deformable piece of material. Likewise, the arrangement between drive wheel 32 and support wheel 40 can comprise any conventional connecting configuration. Likewise, the article transfer member 42 illustrated in the figures as a relatively simple deflecting bar 64 can take on any manner of shape or configuration. For example, transfer member 42 may also be a driven or movable member. Various other modifications and variations are also possible in the other components of the invention. It is intended that the present invention include such modifications and variations as come within the scope of the appended claims and their equivalents.

What is claimed:

1. An apparatus for controlling the flow of articles, comprising:

a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a movable transport member disposed within said space defined between said conveyors and comprising a bridge extending between said conveyors and generally flush with upper surfaces of said conveyors;

said transport member drivingly engaged by both of said conveyors so as to move linearly between said conveyors depending on a speed differential between said conveyors causing said transport member to move in the direction of the faster of said conveyors; and an article transfer member carried by said transport member and operably disposed transversely to said conveyors to contact and transfer articles from said first conveyor to said second conveyor.

2. The apparatus as in claim 1, wherein said transport member comprises a drive wheel simultaneously engaged by drive lugs on each of said conveyors so as to continuously rotate so long as at least one of said conveyors is moving.

3. The apparatus as in claim 1, wherein said bridge comprises a deformable rail member having dimensions so as to fit between said conveyors over a length thereof.

4. The apparatus as in claim 3, wherein said rail member comprises a plurality of pivotally connected links having an upper surface generally flush with said upper surfaces of said conveyors.

5. The apparatus as in claim 4, wherein said conveyors comprises guide channels on inside facing edges thereof, said links moveable in and along said guide channels.

6. The apparatus as in claim 5, wherein said conveyors comprise individual interconnected segments, said guide channels formed integral with said segments.

7. The apparatus as in claim 1, wherein said article transfer member comprises a deflecting bar member carried by said transport member, said bar member having a length so as to extend at least across said first conveyor.

8. The apparatus as in claim 1, further comprising a deflecting rail carried by said transport member longitudinally distanced from said bridge and oriented so as to deflect articles transferred from said first conveyor over said bridge to a middle portion of said second conveyor.

9. The apparatus as in claim 8, wherein said deflecting rail is spring loaded towards said second conveyor.

10. The apparatus as in claim 1, wherein said transport member comprises a carriage connected at one end to a drive wheel and at an opposite end to a support wheel, said drive wheel having teeth engaged with drive lugs on said conveyors, said article transfer member carried by said carriage.

11. The apparatus as in claim 10, wherein said bridge comprises a deformable rail having an end connected to said carriage.

12. An apparatus for controlling the flow of articles, comprising:

a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a carriage member having a drive wheel engaged with drive lugs on each of said conveyors so that said carriage member moves along said conveyors depending on a speed differential between said conveyors causing said carriage member to move in the direction of the faster of said conveyors;

a longitudinally extending deformable rail member attached to said carriage member so as to move therewith relative to said conveyors, said rail member disposed between said conveyors and having an upper surface generally flush with an upper surface of each of said conveyors; and an article transfer member carried by said carriage member and extending across at least a portion of said first conveyor so that articles on said first conveyor are deflected by said transfer member over said rail member and onto said second conveyor.

13. The apparatus as in claim 12, wherein said carriage member further comprises a support wheel longitudinally distanced from said drive wheel.

14. The apparatus as in claim 12, wherein said rail member comprises a plurality of interconnected links, said links moveable within and along channels defined on facing edges of said conveyors.

15. The apparatus as in claim 12, further comprising a deflecting rail carried by said rail member longitudinally distanced from said carriage member and oriented so as to deflect articles transferred from said first conveyor over rail member to a middle portion of said second conveyor.

16. The apparatus as in claim 15, wherein said deflecting rail is spring loaded towards said second conveyor.

* * * * *